Oct. 8, 1957  F. BAUMANN  2,809,099
PROCESS FOR SIMULTANEOUSLY PRODUCING HYDROGEN
AND A CARBON MONOXIDE HYDROGEN MIXTURE AND A
PLANT FOR CARRYING OUT THE PROCESS
Filed Oct. 7, 1954
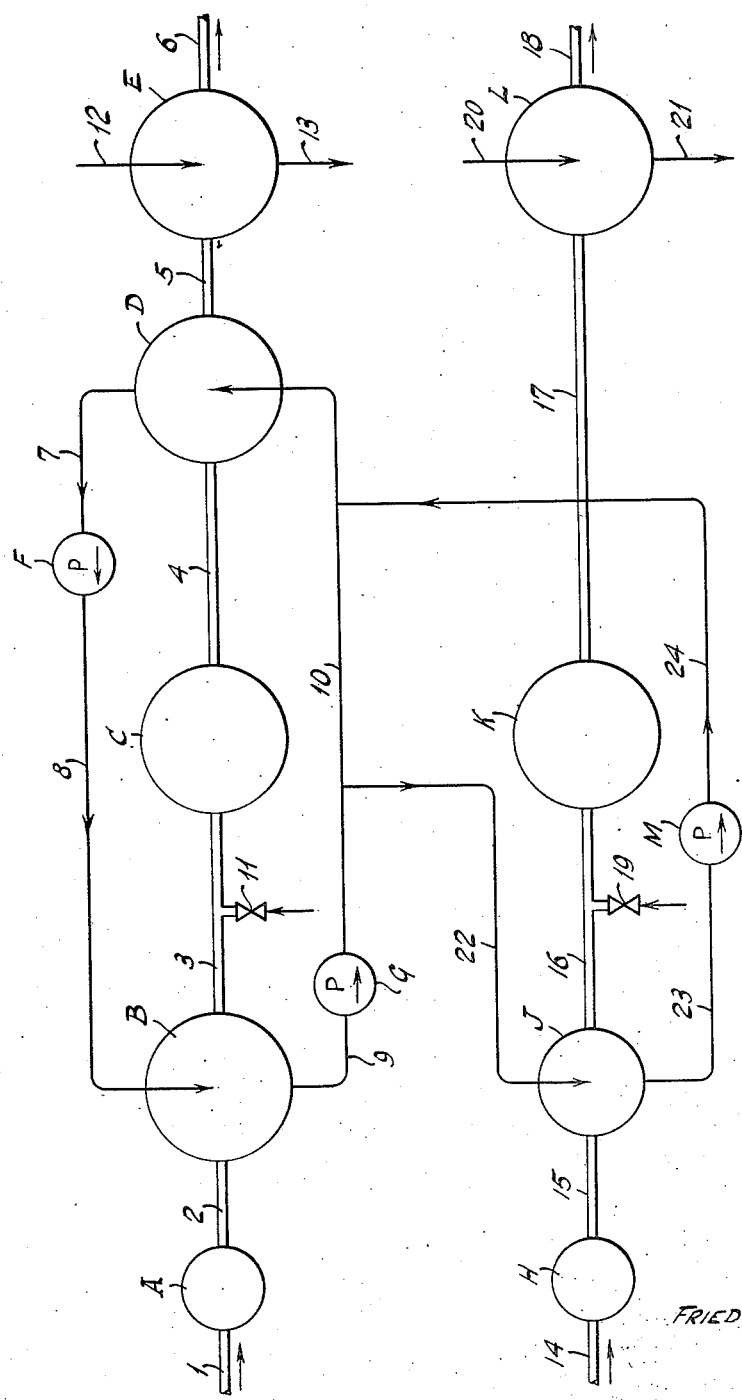
INVENTOR
FRIEDRICH BAUMANN

United States Patent Office 2,809,099
Patented Oct. 8, 1957

2,809,099

PROCESS FOR SIMULTANEOUSLY PRODUCING HYDROGEN AND A CARBON MONOXIDE HYDROGEN MIXTURE AND A PLANT FOR CARRYING OUT THE PROCESS

Friedrich Baumann, Leuna, Germany, assignor to Veb Leuna-Werke "Walter Ulbricht," Leuna (Kreis Merseburg), Germany Application October 7, 1954, Serial No. 460,988

5 Claims. (Cl. 23—213)

My invention relates to the reaction of carbon monoxide with steam to form carbon dioxide and hydrogen.

An object of the invention is to provide an improved process for the catalytic conversion of carbon monoxide in a raw gas, mainly with regard to the thermic efficiency of such processes.

It is also an object of this invention to provide an improved process for simultaneously producing hydrogen and a carbon monoxide hydrogen mixture by a full and a partial conversion of carbon monoxide in a raw gas, for example water gas or a natural gas.

It is another object of this invention to provide an improved process for simultaneously producing mixtures of hydrogen and carbon monoxide in different relative proportions from a carbon monoxide containing raw gas.

It is still another object of this invention to provide an improved plant for simultaneously producing hydrogen and a carbon monoxide hydrogen mixture according to my invention.

Other objects and advantages will become apparent from the accompanying description and disclosure.

It is believed that the invention may be best described by reference to the accompanying drawing which schematically shows the flow diagram of a plant for carrying my invention into effect. For clearness, in each of the various steps of the working process only one apparatus is represented in the drawing, whilst in most industrial plants a plurality of such apparatus working in parallel will be arranged.

With reference to the drawing I shall described by way of example the process and a plant according to my invention for producing hydrogen and a carbon monoxide hydrogen mixture from a carbon monoxide containing raw gas.

In accordance with my invention a quantity of the raw gas is passed to a system for an extensive conversion of the carbon monoxide to produce hydrogen, whilst another part of the raw gas passes to a system for partial conversion of the carbon monoxide to produce a carbon monoxide hydrogen mixture.

Raw gas, for example water gas, for the extensive carbon monoxide conversion, which may be designated as the main or full conversion, is drawn by blower A through conduit 1 and pressed into the following parts of the system. The raw gas from conduit 2 flows upward through the humidifying system B comprising several large towers arranged in parallel, in which the incoming raw gas is scrubbed by spray water to become saturated with steam. The humidified raw gas from system B is passed through conduit 3 where fresh steam is introduced to the raw gas through pipe 11. The gas steam mixture thus formed is further passed to system C comprising heat exchanger and contact furnace. The gas steam mixture after being heated in this heat exchanger to the temperature at which the catalytic conversion is started, is passed over the catalyst, which suitably may be iron oxide containing chromium oxide. The reaction is carried out between 400° and about 600° C.

In the converter of system C steam reacts with carbon monoxide to form carbon dioxide and hydrogen. Since the reaction is exothermic no additional heat need be added. Gas leaving the converter passes back through the heat exchanger of system C giving up heat to the incoming gases. The gas is then passed through conduit 4 to the dehydrating system D comprising scrubbing towers in which the gas from the converter is further cooled and a large quantity of excess steam not needed for reaction is condensed and separated. This cooling and dehydrating action in system D is performed by immediately spraying warm water in a counter flow on the gas-steam mixture in the scrubbing and condensing towers of this system. The scrubbing towers of system B and D may contain wooden lattice, ceramic fillings or the like.

The lower parts of the saturating towers of system B and the lower parts of the condensing towers of system D are formed as water holders. The heated water used in the condensing towers of system D, as described, is passed by pump F through pipes 7, 8 to the heads of the scrubbing towers of system B wherein it is used for scrubbing the incoming raw gas and saturating it with steam as mentioned. The warm water running off from the saturating towers of B is passed by pump G through pipes 9, 10 to the heads of the condensing towers of system D, wherein it is sprayed as described for cooling the converted hot gas.

The action of the re-circulating water system 7, 8, 9, 10 may be summarized as follows. The water is heated in the condensing towers D by cooling the converted gases and condensing out the excess steam, then passed by pump F back to the saturating towers B. In the saturating towers, the incoming raw gas is heated and saturated with steam, thereby cooling the circulating water, which is then passed by pump G to condensing towers D to complete the circuit.

The converted gas leaves the dehydrating system D through the heads of the condensing towers from where it is passed through conduit 5 to the final cooler E, in which the steam may be condensed by immediately being sprayed with cold water, and through conduit 6 to a plant for subsequent treatment.

The catalytic carbon monoxide conversion as described is an exothermic equilibrium reaction in which the equilibrium is situated the more on the side of the carbon dioxide and the hydrogen, as the temperature of reaction is lower. The equilibrium constant depends very much on the temperature. In practice, however, only temperatures above 400° C. can be applied, because the contact substances to be used for industrial purposes allow working only above approximately 400° C. An extensive conversion of carbon monoxide requires a large excess of steam. For example a reduction of a 30–40% carbon monoxide content in a water gas to a 3–4% content in the converted gas requires a quantity of steam equal three times the quantity theoretically needed. By applying the re-circulating warm water system use is made of this excess steam for heating the water required for saturating the raw gas. When from a raw gas containing about 30–35% CO a cooled converted gas containing about 3–4% CO is produced, approximately half of the steam in the raw gas-stream mixture lead through the conversion step is taken from the re-circulating warm water system. The rest is added in form of fresh steam through pipe 11.

Through conduit 14 the blower H draws raw gas for only partial conversion of the carbon monoxide to produce the carbon monoxide hydrogen mixture.

The raw gas then passes through conduit 15 to the saturating towers of the humidifying system J, flows through these saturating towers upward and through conduit 16 to the system K, which, as the system C, comprises heat exchanger and contact furnace. The converted gas passes through conduit 17 to the cooler L and through conduit 18 to a plant for subsequent treatment. Fresh steam is introduced through pipe 19.

Warm water taken from pipe 10 is led through pipe 22 to the head of the saturating towers of system J in which it is sprayed in a counter flow into the raw gas, whereafter it is passed back by pump M through pipes 23, 24 into pipe 10. The quantity of water flowing in this side branch 22, 23 of the re-circulating system of the main conversion and passing to the saturating towers of system J can of course be controlled and adapted to the progress of the partial conversion.

By the described method of working in accordance with my invention the quantity of fresh steam needed for the partial conversion is considerably reduced as compared with those methods of partially converting carbon monoxide, wherein no re-circulating hot water system is used but the whole quantity of steam needed for the conversion is introduced in form of fresh steam. If the relation between the amount of gas of the main conversion and the amount of gas of the partial conversion is favorable, it is even possible to omit entirely a supply of fresh steam for the partial conversion. An essential advantage of my new process is the fact that the working conditions of the full conversion are not changed though heat is removed from the hot water. By saturating the raw gas for the partial conversion the warm water for the full conversion reaches the dehydrating system at a somewhat lower temperature but is heated in the dehydrating system to a temperature equal to that without cooling, because the quantity of water flowing to the dehydrating system is relatively small. By this reason the temperature of the water leaving the dehydrating system, in which the heat is exchanged with the hot gas, depends essentially only on the dew-point of the converted gas. In consequence of the large steam content of the converted gas the dew-point is very high, as a rule approximately at 80–81° C. In consequence of the height of the dew-point the water always attains approximately the temperature of the dew-point, independent of the temperature of the water flowing to the dehydrating system being some degrees higher or lower.

On the other hand the contact gas of the full conversion, by leaving the dehydrating system at a lower temperature as in the case of using warmer water, will contain less steam. The quantity of heat removed from the re-circulating water system of the full conversion and led to the partial conversion system at the saturation of the raw gas, is won back totally by avoiding the hitherto inevitable losses of heat contained in the cooling water of the full conversion.

In consequence of the low temperature of the gas and its small steam content when leaving the dehydrating system the final cooler need remove less heat, whereby the quantities of cooling water and of pump energy required are reduced. In practice this energy of saved cooling water equals the energy for conveying the warm water to the saturating towers of the humidifying system of the partial conversion.

The process according to my invention is not limited to the pressure-free conversion of carbon monoxide in water gas or other raw gases. It may also be carried out with conversions under pressure. In these cases the water temperatures are higher in accordance with the height of the working pressures, and hitherto also the losses of heat generally are higher. By the new method according to my invention it is possible to considerably reduce these losses.

From the hydrogen produced in the full conversion system a nitrogen-hydrogen mixture may be recovered for example for the ammonium synthesis, or the hydrogen may be used for the production of benzine by high pressure hydrogenation. The conversion is performed as completely as possible, in order to obtain a gas free of carbon monoxide for synthesis.

In the partial conversion system a hydrogen carbon monoxide mixture may be produced in a distinct relative proportion for example for the alcohol- and isobutyl-oil synthesis, the synol-synthesis and the Fischer-Tropsch method for benzine production. In these cases only a part of the carbon monoxide of the raw gas is converted, so that a gas is produced having the desired proportion of hydrogen and carbon monoxide, for example 2:1.

Though with such partial conversions the quantity of steam needed per m.$^3$ gas to be converted usually is small, in consequence of the large quantities of gas to be converted in such industrial plants the quantity of steam needed is considerable. Even relatively small improvements of the economy of such processes are of considerable importance. Therefore it has been often tried to reduce the steam consumption for such partial conversions by replacing the steam as much as possible by hot water. In most cases this is impossible because a sufficient quantity of hot water is not available, which also has to be sufficiently clean.

*Example*

From watergas, obtained by gasification of lignite low temperature coke, containing 42% $H_2$, 31% CO, 25% $CO_2$ and 2% $N_2+CH_4$, on the one hand by converting about 90% of the carbon monoxide a gas is produced which is further reacted to produce 96–97% hydrogen for benzine synthesis. On the other hand by partial (33%) conversion of carbon monoxide a starting material for the methanol synthesis is obtained, containing about 67% $H_2$, 30% CO, 1% $CO_2$ and 2% $N_2+CH_4$. The plant used for both conversions agrees with the scheme shown in the drawing. 80,000 m.$^3$ water gas per hour are passed through the full conversion step, 20,000–25,000 m.$^3$ water gas per hour pass the partial conversion step for methanol synthesis. The water gas is saturated in the humidifying system with water of 80° C. and leaves it at 78° C. After addition of 40 metric tons fresh steam (2 atmospheres' excess pressure) per hour, the gas-steam mixture is led through the contact furnace, leaving it at 160° C. At this temperature it reaches the dehydrating system, in the condensing tower of which water running off from the humidifying system is sprayed. The water temperature is 66° C. If this water would not be used for humidifying the water gas for the partial conversion, but only for dehydrating the converted gas of the full conversion, this gas would leave the dehydrating system at about 71° C. The water heated in the dehydrating system leaves it at 80° C. 1400–1450 m.$^3$ water circulates per hour.

Before applying the method of my invention 4–4.5 metric tons of fresh steam per hour were to be added for saturating the water gas for the partial conversion. This steam consumption is totally avoided by branching off 10–15% of the warm water from the recirculating water system and spraying it on the water gas in the additionally provided humidifying system. This may be of course of considerably smaller size than the humidifying system of the full conversion. The water of 66° C. led to the smaller humidifying system is cooled by evaporation to 51° C. and then mixed with the remaining water of the re-circulating system. The temperature at the top of the condensing towers of the dehydrating system is reduced thereby to 64° C. and the temperature of the converted gas when leaving the dehydrating system to 69° C. The water running off from the dehydrating system reaches nearly 80° C., in any case 79 to 80° C., so that the working conditions of the full conversion and thereby of the steam consumption thereof remain actually unchanged. The method of my invention requires therefore no additional fresh steam for saturating the gas.

I claim:

1. The process of simultaneously producing separate hydrogen gas and mixed carbon monoxide-hydrogen gas, comprising the steps of passing first and second streams of crude gas containing carbon monoxide through first and second humidifying means, respectively, adding fresh steam to each of said humidified streams to form first and second crude gas-steam mixtures, passing said first and second crude gas-steam mixtures over first and second catalysts and through first and second contact furnace means, respectively, to convert the carbon monoxide in said first crude gas-steam mixture substantially completely into hydrogen and carbon dioxide and to convert the carbon monoxide in said second crude gas-steam mixture only partially into hydrogen and carbon dioxide, passing the substantially completely converted first mixture through dehumidifying means to remove moisture in the form of water, circulating said water from said dehumidifying means to said first humidifying means for contact in the same with said first crude gas stream and thence back to said dehumidifying means for contact therein with said substantially completely converted first mixture, simultaneously transferring a portion of said water leaving said first humidifying means to said second humidifying means for contact in the latter with said second crude gas stream and thence to said dehumidifying means, finally dehydrating both said substantially completely converted first mixture and said partially converted second mixture, and thereafter extracting the resultant hydrogen gas from said substantially completely converted first mixture, and the resultant mixed carbon monoxide-hydrogen gas from said partially converted second mixture.

2. The process of simultaneously producing separate hydrogen gas and mixed carbon monoxide-hydrogen gas, comprising the steps of passing first and second streams of crude gas containing carbon monoxide through first and second humidifying means, respectively, adding fresh steam to the first of said humidified streams to form a crude gas-steam mixture, passing said crude gas-steam mixture over a first catalyst and through first contact furnace means to convert the carbon monoxide in said crude gas-steam mixture substantially completely into hydrogen and carbon dioxide, passing the second of said humidified streams over a second catalyst and through second contact furnace means to convert the carbon monoxide in said second humidified stream only partially into hydrogen and carbon dioxide, passing the substantially completely converted mixture through dehumidifying means to remove moisture in the form of water, circulating said water from said dehumidifying means to said first humidifying means for contact in the latter with said first crude gas stream and thence back to said dehumidifying means for contact therein with said substantially completely converted mixture, simultaneously transferring a portion of said water leaving said first humidifying means to said second humidifying means for contact therein with said second crude gas stream and thence to said dehumidifying means, finally dehydrating both said substantially completely converted mixture and said partially converted second stream, and extracting the formed hydrogen gas from said substantially completely converted mixture, and the formed mixed carbon monoxide-hydrogen gas from said partially converted second stream.

3. In the process of simultaneously producing separate hydrogen gas and mixed carbon monoxide-hydrogen gas; the steps of passing first and second streams of crude gas containing carbon monoxide through first and second humidifying means, respectively, adding fresh steam to the first of said humidified streams to form a crude gas-steam mixture, passing said crude gas-steam mixture over a first catalyst and through first contact furnace means to convert the carbon monoxide in said crude gas-steam mixture substantially completely into hydrogen and carbon dioxide, passing the second of said humidified streams over a second catalyst and through second contact furnace means to convert the carbon monoxide in said second humidified stream only partially into hydrogen and carbon dioxide, passing the substantially completely converted mixture through dehumidifying means to remove moisture in the form of water, circulating said water from said dehumidifying means to said first humidifying means for contact in the latter with said first crude gas stream and thence back to said dehumidifying means for contact therein with said substantially completely converted mixture, and simultaneously transferring a portion of said water leaving said first humidifying means to said second humidifying means for contact therein with said second crude gas stream and thence to said dehumidifying means.

4. In a plant for producing separately and simultaneously from first and second streams of carbon monoxide-containing crude gas a quantity of hydrogen gas and a quantity of mixed carbon monoxide-hydrogen gas; a first system comprising first humidifying means, first catalytic converter means, dehumidifying means, first conduit means establishing communication between said first humidifying means and said first catalytic converter means and between the latter and said dehumidifying means for passage of said first crude gas stream sequentially through said first humidifying means for contact in the same with first humidification water, through said first catalytic converter means for substantially complete conversion of the carbon monoxide in said first stream into hydrogen and carbon dioxide, and through said dehumidifying means for contact in the latter with dehumidification water to remove excess moisture in the form of water, first pipe means including first pump means for transferring the water resulting from the dehumidification directly from said dehumidifying means to said first humidifying means to constitute said first humidification water, second pipe means including second pump means for transferring the water remaining after the humidification from said first humidifying means to said dehumidifying means to constitute said dehumidification water, and means communicating with said first conduit means at a location between said first humidifying means and said first catalytic converter means for introducing fresh steam into said first conduit means, and a second system comprising second humidifying means, second catalytic converter means, second conduit means establishing communication between said second humidifying means and said second catalytic converter means for passage of said second crude gas stream sequentially through said second humidifying means for contact therein with second humidification water, and through said second catalytic converter means for partial conversion of the carbon monoxide in said second stream into hydrogen and carbon dioxide, third pipe means communicating with said second pipe means at a location between said second pump means and said dehumidifying means for transferring a portion of said water flowing in said second pipe means into said second humidifying means to constitute said second humidification water, and fourth pipe means including third pump means communicating with said second pipe means at a location between said dehumidifying means and the junction of said second and third pipe means for returning to said second pipe means and therethrough to said dehumidifying means any water remaining from the humidification in said second humidifying means.

5. In a plant for the catalytic conversion of carbon monoxide contained in a crude gas; a first converting system including first humidifying means, first catalytic converter means for substantially completely converting any carbon monoxide present into hydrogen and carbon dioxide, and dehumidifying means, a first pipe system connecting said first humidifying means and said dehumidifying means for circulating water from each one to the other, a second converting system including second humidifying means and second catalytic converter means for only partially converting any carbon monoxide present into hydrogen and carbon dioxide, and a second pipe system connected to two points of that part of said first pipe system conducting water from said first humidifying means to said dehumidifying means for transferring a portion of said last-named water through said second humidifying means and thence to said dehumidifying means.

References Cited in the file of this patent
UNITED STATES PATENTS

| | | |
|---|---|---|
| 1,935,675 | Spalding | Nov. 21, 1933 |
| 1,988,759 | Svanoe | Jan. 22, 1935 |